United States Patent

Fachini et al.

[11] Patent Number: 5,212,937
[45] Date of Patent: May 25, 1993

[54] COTTON HARVESTER

[75] Inventors: Robert M. Fachini, Naperville, Ill.; Arvel L. Black, Hereford, Tex.

[73] Assignee: Case Corporation, Racine, Wis.

[21] Appl. No.: 786,524

[22] Filed: Nov. 1, 1991

[51] Int. Cl.⁵ .................. A01D 46/08; D01B 1/02
[52] U.S. Cl. ............................ 56/28; 56/30; 19/203
[58] Field of Search .............. 56/28, 30, 40, 50; 460/97, 98; 19/202, 203

[56] References Cited

U.S. PATENT DOCUMENTS

| | | | |
|---|---|---|---|
| 3,881,226 | 5/1975 | Kent et al. | 56/30 X |
| 4,344,271 | 8/1982 | Schlueter et al. | 56/13.6 |
| 4,390,376 | 6/1983 | Rood, Jr. | 56/28 X |
| 4,821,496 | 4/1989 | Kysar | 56/28 |
| 4,947,628 | 8/1990 | Orsborn et al. | 56/28 X |

OTHER PUBLICATIONS

J. I. Case Company 1800 Cotton Harvester Parts Catalog, pp. 9A-12 to 9A-19, inclusive (1991).

Primary Examiner—David J. Bagnell
Attorney, Agent, or Firm—Rudnick & Wolfe

[57] ABSTRACT

A cotton harvester having a harvesting head assembly mounted to a chassis of the harvester for generally vertical movement. The harvesting head assembly includes a plurality of harvesting units for removing a commingled mixture of materials including trash and cotton from plants as the harvester is driven across a field, and a cleaning mechanism for receiving and processing the commingled mixture of materials received from the harvesting units thereby separating trash from cotton as the harvester moves across the field. The cleaning mechanism is mounted between the harvesting units and a discharge area on the head assembly to facilitate the flow of cotton materials to a cotton receiving receptacle and increase the holding capacity of the receptacle by eliminating trash that normally flows thereto as a result of the harvesting operation.

22 Claims, 7 Drawing Sheets

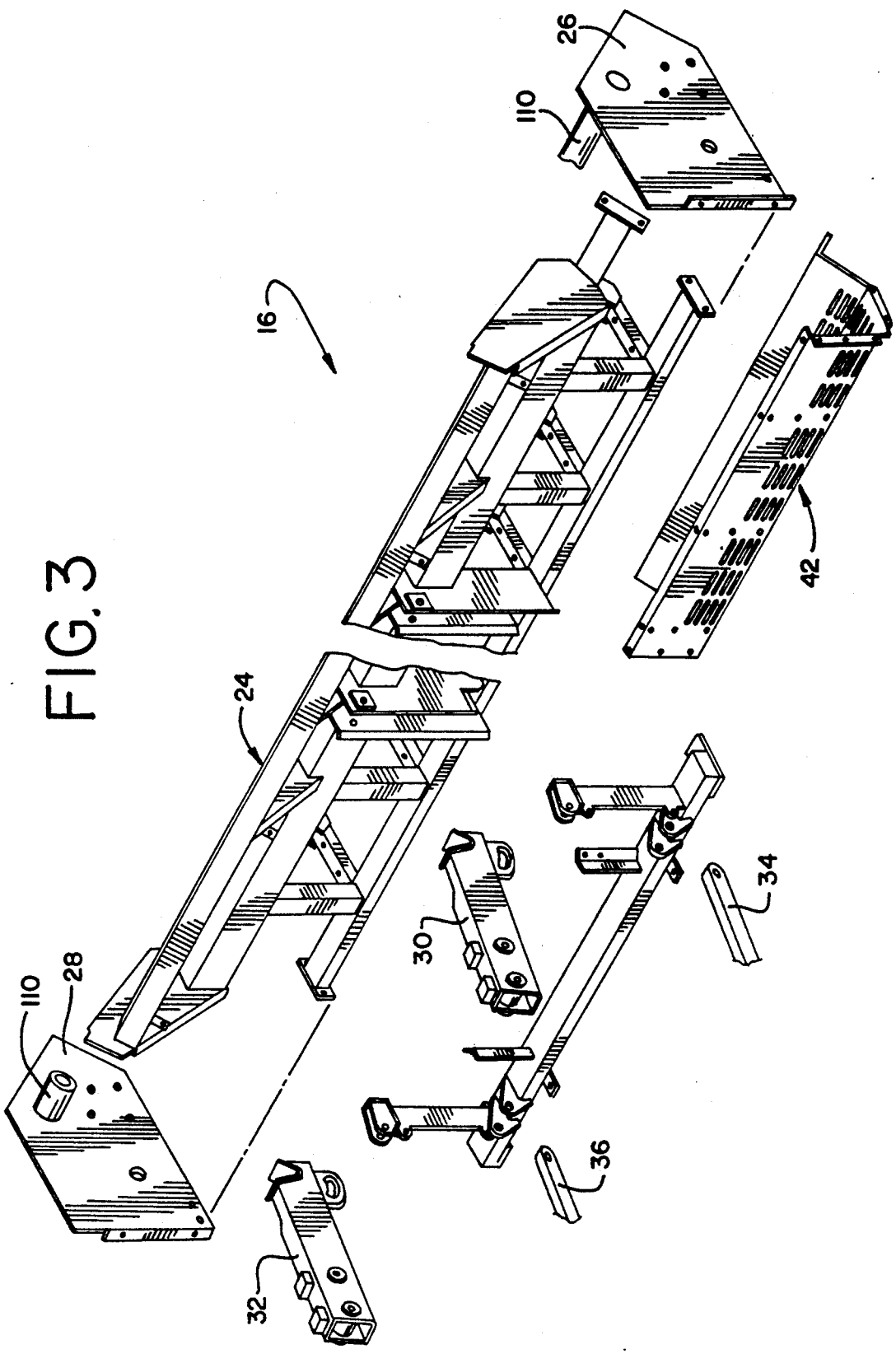

5,212,937

COTTON HARVESTER

FIELD OF THE INVENTION

The present invention generally relates to cotton harvesters and, more particularly, to a cotton harvesting head assembly having cleaning means for processing harvested materials directly received from harvesting units mounted on the harvesting head assembly.

BACKGROUND OF THE INVENTION

Cotton harvesters typically include a series of harvesting units supported on a harvesting head assembly for harvesting materials from generally parallel rows of cotton plants. The harvesting units are carried by the head assembly in side-by-side relation relative to each other and extend laterally across a forward end of the harvester. To facilitate harvesting of materials from plants arranged in numerous combinations of row spacings, the harvesting units are usually connected to a frame of the head assembly in a manner allowing for lateral adjustment of the harvesting units relative to each other.

Each harvesting unit includes a fore-and-aft extending housing which carries a pair of brush-type rollers for stripping materials from the plants. The materials stripped from the plants are advanced toward and exhausted from a rear end of the harvesting unit housing. A rotatably driven cross-auger on the head assembly gathers and directs the harvested materials exhausted from the harvesting units toward a lateral center of the harvester.

An inherent feature of cotton strippers is that trash is commingled along with the cotton materials during the harvesting process. That is, in addition to the cotton materials, a relatively high amount of trash including green bolls, stones, rocks, plant leaves, twigs, and other plant parts are stripped from the plants by the brush-type rollers of the harvesting units during the harvesting process. As will be appreciated, trash such as leaves, twigs, and other plant parts contaminate and, ultimately, must be separated from the desired cotton materials.

Cleaning systems have been devised to separate the trash from the harvested cotton materials. Field or gin cleaning systems have long been known for use in cleaning the harvested materials of a cotton harvester. Field or gin cleaning systems are arranged separate from the harvester and involve a labor intensive operation which is separate from the harvesting operations.

Other cotton cleaning systems are known to be mounted on the cotton harvester. Those cleaning systems mounted on the cotton harvester have the distinct advantage of cleaning the harvested materials before they are passed to the receptacle or basket.

Known cotton cleaning systems mounted on the harvester typically include a complex assemblage of parts including a plurality of ducts and air systems for handling the harvested materials. A typical cleaning system includes a first duct for upwardly conveying and directing the harvested materials from the cleaning system to the receptacle and a second duct for upwardly delivering the cotton materials from the harvesting head assembly to the cleaning system.

Besides having a plurality of duct structures, these known cleaning systems further include a first air system including a primary fan arranged in combination with the first duct structure for upwardly moving the cotton material from the cleaning system to the receptacle. A second or auxiliary air system, including a second or auxiliary fan arranged in combination with the second duct structure, is required for moving the harvested materials between the head assembly and the cleaning system. As will be appreciated, requiring a secondary air system adds substantially to the number of parts on the harvester and detracts from operation of the harvester by the drawing horsepower to drive the additional fan. Moreover, and for reasons not completely understood, the use of air in advancing harvested materials toward the cleaning system has an adverse effect on the cleaning process and detracts from efficient separation of trash from cotton materials.

Known cleaning systems on the harvester also limit the harvesting capacity of the machine. During the harvesting operation, the auger compiles the harvested material from all the harvester units and the compilation of material is presented to the cleaning system. Accordingly, when operating in heavy harvest conditions, the efficiency of the cleaning system decreases as compared to light harvesting conditions. Moreover, these known cleaning systems are configured to discharge the trash materials therefrom in a concentrated area rather than broadcasting the trash over a larger area.

Thus, there is a need and a desire for a cleaning system which is carried by the cotton harvester and which effectively and efficiently separates trash material from cotton materials with a minimum number of parts.

SUMMARY OF THE INVENTION

In view of the above, and in accordance with the foregoing, there is provided a cotton harvester with a harvesting head assembly laterally extending thereacross for harvesting materials including a commingled mixture of trash and cotton from plants as the harvester is driven across a field. The head assembly includes a plurality of harvesting units which exhaust harvested materials toward a rotatably driven auger mounted on the head assembly. To promote the separation of cotton from other trash in the harvested materials, the head assembly further includes cleaning means interposed between the harvesting units and a discharge area of the head assembly for cleaning the harvested materials whereby trash and the like is separated from cotton materials before the cotton materials are moved toward a cotton receiving receptacle. With the present invention, the harvested materials are advantageously fed to the cleaning means by gravity rather than air as on other cleaning systems.

In a preferred form of the invention, a duct is carried on the chassis of the harvester and has an inlet arranged to receive cotton materials from the harvesting head assembly. The cotton harvester is further provided with an air system including a single fan for creating an air flow within the duct to facilitate advancement of cotton materials toward the cotton receiving receptacle.

Rather than receiving a compilation of harvested materials from all the harvesting units, the cleaning means of the present invention is arranged such that a portion thereof extends rearwardly of each harvesting unit. Thus, that portion of the cleaning means extending rearward of a particular harvesting unit cleans the harvested materials received from that particular harvesting unit independently of the harvested materials exhausted from the other harvesting units. Moreover, extending the cleaning means laterally across the harvester allows the trash which is separated from the cotton materials to be distributed across the width of the harvester.

In a most preferred form of the invention, the cleaning means includes primary and secondary cleaner assemblies laterally extending parallel to each other and across the harvester. Each cleaner assembly includes a laterally elongated rotatable member having a sawtooth peripheral configuration for separating cotton from the materials harvested by the harvesting units.

The cleaning means further includes means for doffing cotton materials from the primary and secondary cleaner assemblies and advancing the cotton materials toward the auger. The cleaner assemblies are enclosed by a housing defining a trough beneath the primary cleaner assembly and into which cotton materials gravitate. The housing is provided with a releasably closed door disposed adjacent the cleaning means for allowing service access to the cleaning assemblies. Preferably, a rotatably driven kicker is provided in the trough area for propelling materials received from the primary cleaner assembly toward the secondary cleaner assembly.

Cotton farmers are continuously changing the spacing between plant rows and, therefore, require a cotton harvester which allows the lateral spacing between the harvesting units to be adjusted to accommodate the various row spacings. Accordingly, the frame of the header assembly is configured such that the harvesting units can be laterally adjusted therealong. Moreover, the header assembly may include an extension which is selectively attachable to the frame of the header assembly. The extension is adapted to accommodate one or more harvesting units thereon so as to allow the harvesting units of the harvester to be arranged in different row patterns. An auger extension is supported on the extension for moving cotton materials toward the inlet to the duct.

An advantage of the present invention is that auxiliary cleaning means can be added to the head assembly to process the harvested materials received from the one or more harvesting units connected to the extension frame. The auxiliary cleaning means includes auxiliary cleaner assemblies arranged in end-to-end relation with and preferably driven by the primary and secondary cleaner assemblies on the frame of the header assembly.

A salient feature of the present invention involves a cleaner assembly arranged on a head assembly of a cotton harvester for gravitationally receiving and cleaning cotton from harvested materials from the harvesting units before the auger passes the materials to the inlet area of the duct. Feeding the harvested materials to the cleaning assemblies by gravity rather than through air assistance is considered an advantage by those skilled in the art.

The cleaning system of the present invention utilizes the existing air system on the harvester and does not require an auxiliary air system, thus saving on horsepower requirements for the harvester. Moreover, by separating trash and the like from the cotton materials, efficiency and capacity of the air system are improved. Furthermore, removing the trash and the like from the harvested materials allows the receptacle to hold more cleaned cotton materials, thus prolonging the field harvesting operation.

Notably, the elongated cleaning means of the present invention is disposed such that a particular section thereof acts upon harvested materials received from only a single harvesting unit rather than a compilation of materials received from a plurality of harvesting units. Thus, the cleaning means realizes a better distribution of harvested materials about the periphery of the cleaner assemblies. Moreover, the cleaner assemblies of the present invention are more accessible for servicing requirements.

Numerous other features and advantages of the present invention will become readily apparent from the following detailed description, the accompanying drawings, and the appended claims.

BRIEF DESCRIPTION OF THE DRAWINGS

FIG. 3 is an exploded perspective view of some of the component parts of the head assembly;

DETAILED DESCRIPTION OF THE INVENTION

Figure 1:
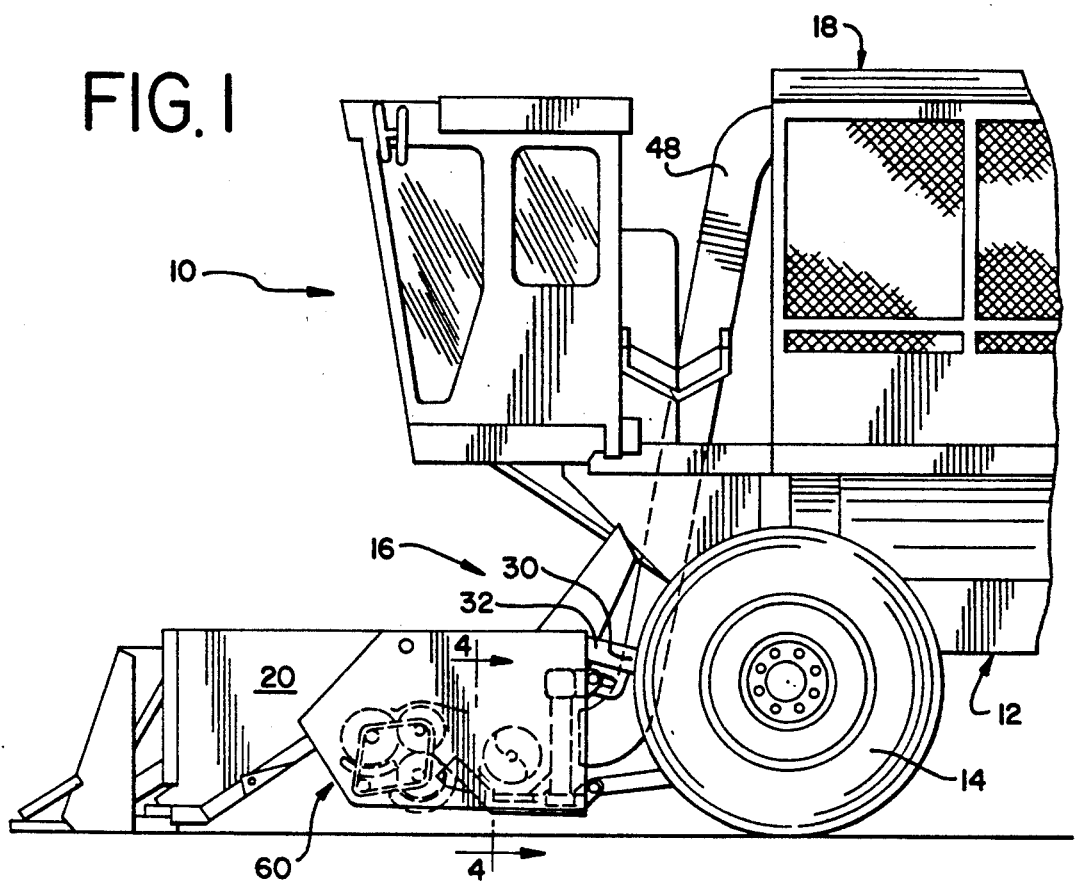
FIG. 1 is a side elevational view of a cotton harvester with a head assembly embodying teachings of the present invention.

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout the several views, in FIG. 1 there is schematically illustrated a cotton harvester 10 including a fore-and-aft extending mobile chassis or frame 12 supported for movement across a field of cotton plants by front and rear pairs of wheels 14, with only one wheel being illustrated for purposes of this description. A harvesting head assembly 16 is mounted on the chassis 12 for harvesting cotton materials from generally parallel rows of cotton plants as the harvester is driven across the field. In the illustrated embodiment, a receptacle 18 is mounted on the chassis 12 for receiving cotton materials from the head assembly.

The harvesting head assembly 16 laterally extends across and is supported on the chassis 12 of the harvester for generally vertical movement. A plurality of harvesting units 20 are individually mounted on the head assembly 16 preferably in side-by-side relation for harvesting materials as the harvester is driven across the field. As is conventional, one or more harvesting units are arranged to one side of the longitudinal center of the harvester while one or more harvesting units are arranged on an opposite side of the longitudinal center of the harvester. As many as six harvesting units may be laterally arranged across the harvester to receive a like number of rows of cotton plants.

Figure 2:
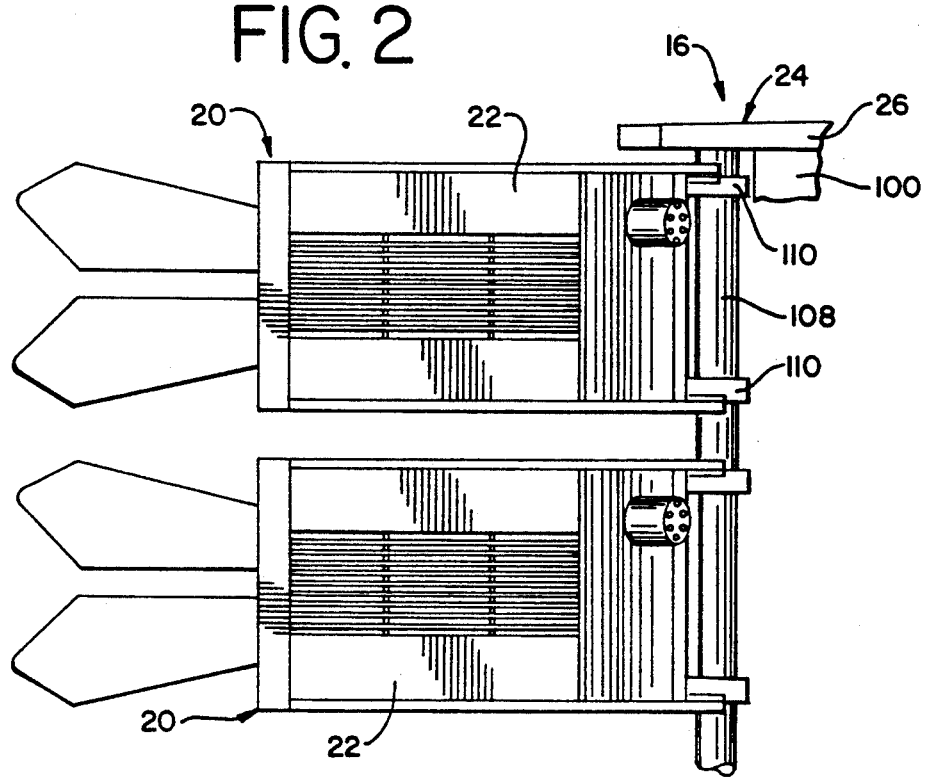
FIG. 2 is a plan view of a portion of the head assembly having harvesting units attached thereto.

Each harvesting unit 20 is a conventional brush-roll type which is adapted to strip materials from the cotton plants as the harvester is driven through the field. As shown in FIG. 2, each harvesting unit 20 includes a fore-and-aft housing 22 defining a central passage which allows the cotton plants to pass therethrough. As shown, each harvesting unit 20 is connected toward a rear end thereof to the head assembly 16.

As shown in FIG. 3, the head assembly 16 includes a laterally elongated frame 24 comprised of a plurality of interconnected tubular members arranged in a laterally elongated generally J-shaped cross-sectional configuration and a pair of fore-and-aft extending support plates 26 and 28 affixed to opposite ends of the frame 24. A pair of laterally spaced lift arms 30 and 32 connect the frame 24 of the head assembly to the chassis 12 of the harvester. In the preferred embodiment, each of the lift arms 30 and 32 are pivotally connected to and extend forwardly from the chassis 12 (FIG. 1) and are powered by drivers (not shown) for controlling the elevation of the frame 24 relative to the chassis of the harvester. A pair of radial arms 34 and 36 combine with the lift arms 30 and 32 to form a generally parallelogram-type linkage which maintains the harvesting units generally parallel to the ground during elevational movements of the head assembly 16.

Figure 4:
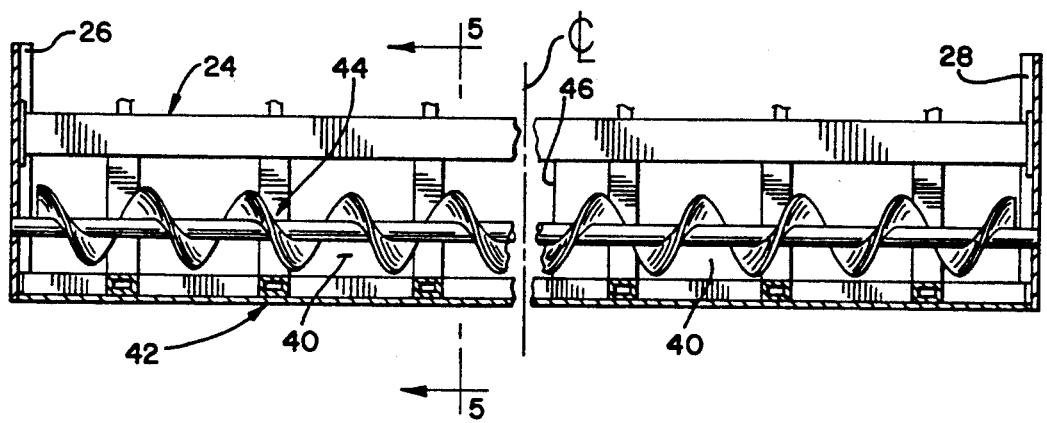
FIG. 4 is a fragmentary longitudinal sectional view of the header assembly taken along line 4—4 of FIG. 1.

As seen in FIG. 4, frame 24 of the head assembly 16 defines a laterally extending and open trough area 40. Conventional panel structure 42 is suitably attached to the frame 24 to enclose the trough area 40. The support plates 26 and 28 close the outboard ends of the trough area 40. Frame 24 of the head assembly 16 also supports a rotatably driven auger 44. Opposite ends of auger 44 are rotatably supported by the side supports 26 and 28 of frame 24 such that the auger 44 extends laterally across the harvester and within trough area 40.

Auger 44 is arranged to extend rearwardly across and below an exhaust end of the harvesting units for gathering and conveying materials toward a discharge area on the head assembly. As shown in FIG. 4, auger 44 includes left and right-hand spiral sections for advancing materials received from the harvesting units arranged on opposite sides of the longitudinal centerline of the harvester toward a discharge area 46 normally located near the longitudinal center of the harvester and from which materials pass from the header assembly 16.

Figure 5:
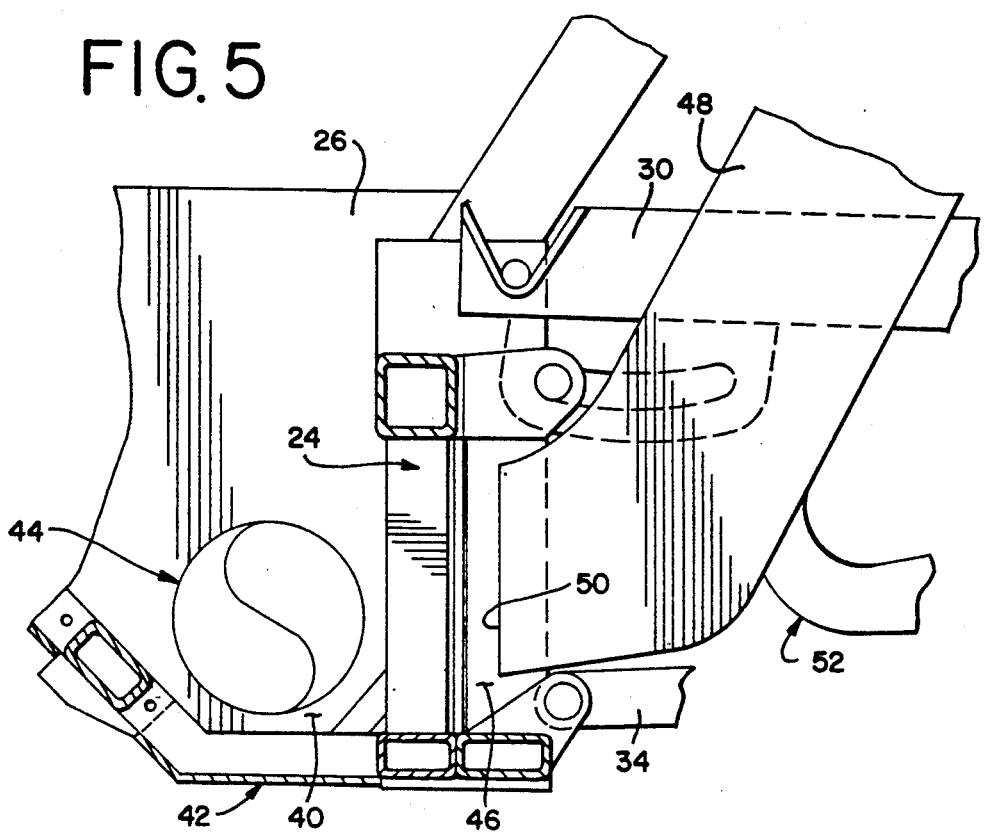
FIG. 5 is a fragmentary sectional view taken along line 5—5 of FIG. 4.

As further shown in FIG. 5, harvester 10 is provided with conveying means including duct structure 48 extending upwardly from the discharge area 46 of the header assembly 16 for moving crop material toward the receptacle 18 (FIG. 1). As shown, duct 48 defines an inlet 50 arranged in material receiving relation to the discharge area 46 of the header assembly 16. An air system 52 including a fan (not shown) creates an air flow within the duct structure 48 to facilitate movement of materials toward the receptacle 18 (FIG. 1).

A salient feature of the present invention involves cleaning means 60 arranged on the head assembly 16 for processing the commingled mixture of materials received from the harvesting units whereby trash and the like are separated from cotton materials as the harvester moves across a field. To promote a reduction of parts and simplify the process of material handling, the cleaning means 60 gravitationally receives harvested materials from the exhaust end of the harvesting units. Moreover, at least a portion of the cleaning means 60 extends rearwardly of each harvesting unit such that the commingled mixture of materials received from a particular harvesting unit are acted upon by a particular section of the cleaning means, thus eliminating the cumulative cleaning effect required of heretofore known cleaning means.

Figure 6:
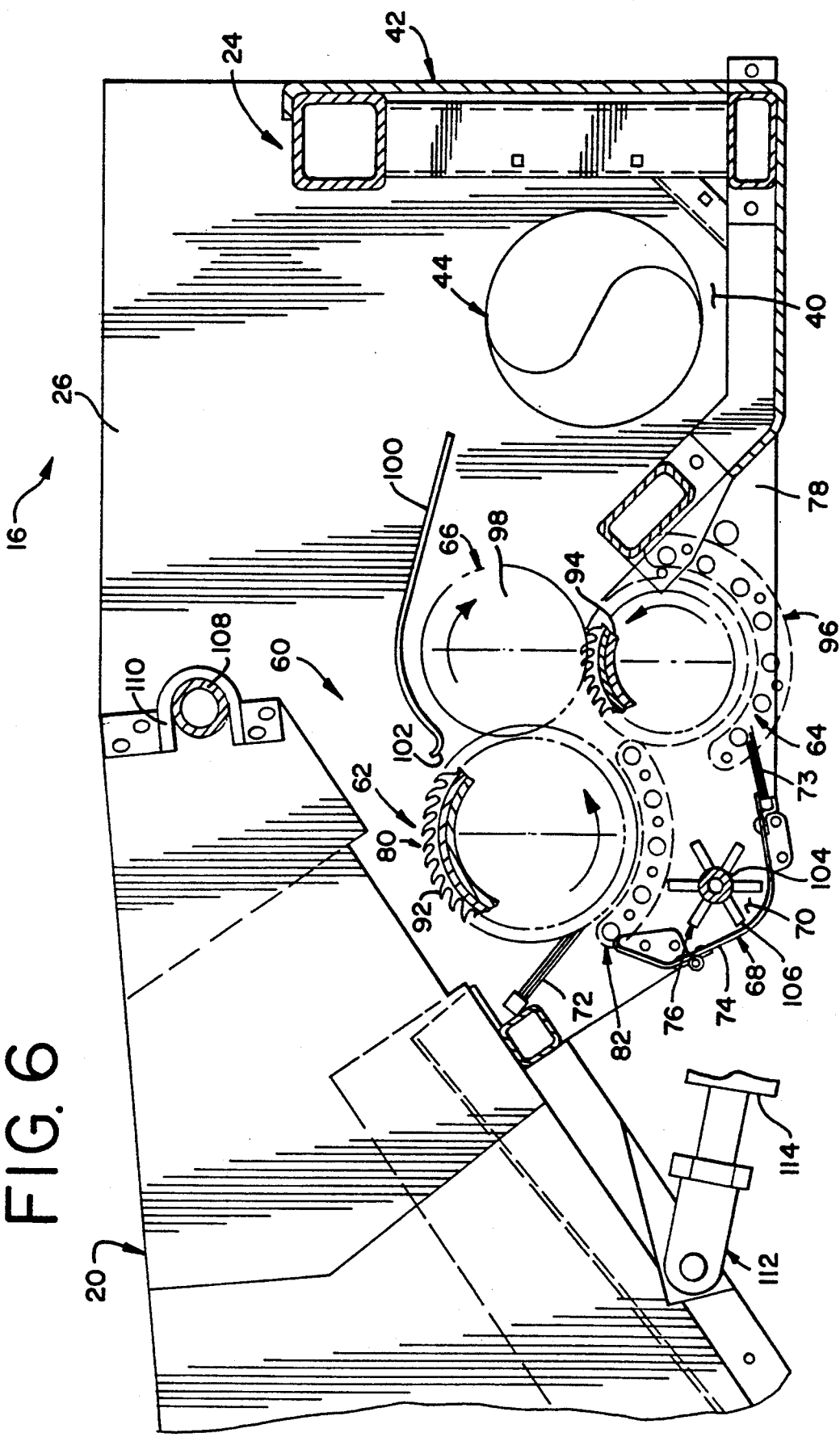
FIG. 6 is an enlarged side sectional view of a rear end of the head assembly of the present invention.

In the preferred embodiment, and as shown in FIG. 6, cleaning means 60 includes a primary cleaner assembly 62, a secondary cleaner assembly 64, and a doffer assembly 66 for doffing cotton materials from the cleaner assemblies 62, 64 and advancing the cotton materials toward the auger 44. The cleaning assemblies 62 and 64 and doffing assembly 66 each rotate about parallel axes and extend rearwardly beneath the discharge end of the harvesting units 20. In a preferred form of the invention, cleaning assemblies 62, 64 and doffer assembly 66 are rotationally supported by the side support plates 26 and 28 on the frame 24.

In a most preferred form, the cleaner means 60 further includes a housing 68 defining a trough area 70 extending beneath the primary cleaner assembly 62 and forwardly of the secondary cleaner assembly 64. To inhibit harvested materials from being discharged to the ground and lost, suitable retaining means such as a laterally extending brush 72 is provided between the harvesting units 20 and the housing 68. Brush 72 allows green bolls, rocks, stones, and the like to be ejected from the cleaning means 60. Other retaining means such as brush 73 can be provided between the rear end of housing 68 and the second cleaner assembly 64. Brush 73 serves to retain cotton materials within the housing 68 while allowing green bolls, rocks, stones and the like to be ejected from the housing 68.

Housing 68 further includes a releasably closed door 74 for allowing service access to the cleaning means 60. As shown, rotatably driven kicker means 76, extending within the trough area 70 of housing 68 and parallel to cleaner assembly 62, serves to propel cotton gravitationally received from the primary cleaner 62 toward the secondary cleaner assembly 64. Notably, a discharge outlet 78 extends beneath the secondary cleaner assembly and across the width of the header assembly 16. The discharge outlet 78 permits trash and the like which is separated from the cotton materials to be discharged across the width of the harvester.

In a preferred form, cleaner assembly 62 includes a rotatable cleaner member 80 and a conventional grid bar assembly 82. The grid bar assembly 82 is arranged in a conventional manner beneath and in partial circumferential relationship with member 80. Member 80 and grid bar assembly 82 are supported by the head assembly 16 and each extend laterally across rearwardly and beneath the exhaust end of the harvesting units 20 such that at least a portion of the cleaner assembly 62 is arranged in material receiving relation to each harvesting unit connected to the head assembly 16.

Figure 7:
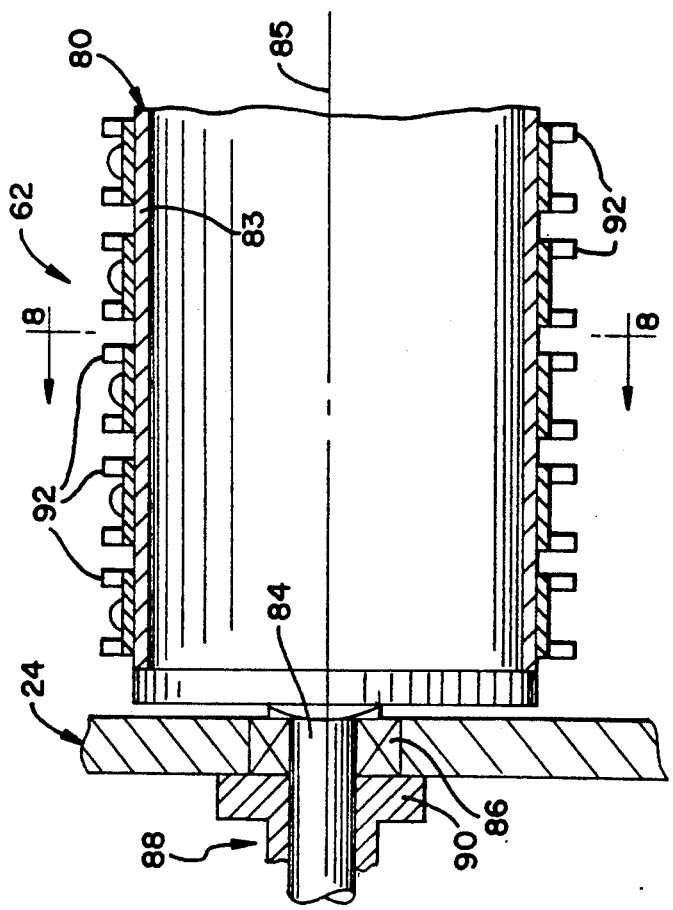
FIG. 7 is a fragmentary longitudinal sectional view of a preferred form of cleaning means forming part of the header assembly.

Turning to FIG. 7, cleaner member 80 is preferably configured as laterally elongated cylindrically shaped tube 83 having a stub shaft 84 fixedly secured at opposite ends thereof to define a fixed axis of rotation 85 for the cleaner assembly. Each stub shaft 84 is journalled for rotation within and extends beyond a bearing assembly 86 carried by a respective side support on frame 20. A suitable drive mechanism 88 including a drive member 90 is affixed to the shaft 84 for imparting rotational movement to the cleaner member 80.

Figure 8:
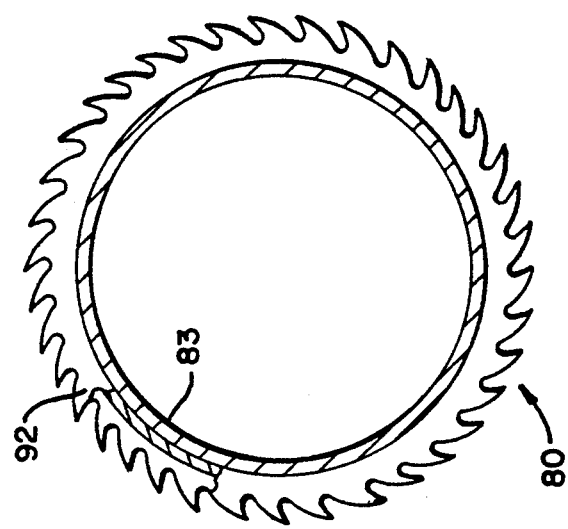
FIG. 8 is a side sectional view of the cleaning means taken along line 8—8 of FIG. 7.

As shown in FIGS. 7 and 8, a series of burr extractors 92 are affixed in side-by-side relation and about the outer peripheral surface of tube 83. The burr extractors 92 are arranged such that the cleaner member 80 is provided with a saw-tooth profile along the entire length thereof. Upon rotation, the saw-tooth profile on the cleaner member 80 facilitates separation of cotton from trash and the like contained within the harvested materials received from the harvesting units.

Notably, drive mechanism 88 is adapted to rotate the cleaner member 80 in either direction about the axis 85. As will be appreciated from FIG. 6, rotation of cleaner member 80 in one direction will allow the burr extractors 92 to separate trash and the like from the cotton in the commingled mixture as the cleaner member 80 is rotated. Reversing the direction of rotation of cleaner member 80 will allow the harvested materials to bypass the cleaning operation and be directed to the auger 44.

Cleaner assembly 64 is substantially similar in construction to cleaner assembly 62 in that it includes a rotatable cleaner member 94 having a conventional grid bar assembly 96 arranged in a conventional manner beneath and in partial circumferential relationship with member 94. Cleaner member 94 and grid bar assembly 96 are supported by the head assembly 16 and each extend laterally across rearwardly parallel and beneath the cleaner assembly 62 to perform a secondary cleaning action on the materials received from cleaner assembly 62.

Cleaner member 94 is configured substantially similar to cleaner member 80 of cleaning assembly 62. Suffice it to say, cleaner member 94 is rotatably supported at opposite ends thereof by the side supports 26 and 28 of the frame 24. Moreover, cleaner member 94 includes a series of burr extractors fastened about the periphery thereof such that the cleaner member 94 is provided with a saw-tooth profile along the entire length thereof. The saw-tooth profile facilitates separation of cotton from the materials received by the cleaner assembly 64.

The doffer assembly 66 includes suitable means for doffing cotton materials from the cleaner assemblies 62 and 64 and rearwardly advancing the cotton materials to the auger 44. In a preferred form of the invention, doffer assembly 66 includes a laterally elongated and rotatably driven generally cylindrical brush 98 adapted for rotation about a fixed axis. Brush 98 extends laterally along and generally parallel to the cleaner assemblies 62 and 64 and is preferably supported for rotation by the side supports 26 and 28 of header assembly 24. An appropriately configured shield 100 is arranged proximate to the brush 98 for directing doffed cotton materials toward the auger 44. Shield 100 extends the length of the doffer assembly 66 and is likewise supported at opposite ends by side supports 26 and 28. As illustrated, a forward end 102 of shield 100 is arranged in close proximity to the peripheral configuration of cleaner assembly 62 to inhibit harvested materials exhausted from the discharge end of the harvesting unit 20 to gravitate toward the doffer assembly 66.

In the illustrated embodiment, kicker means 76 includes a laterally elongated rotatably driven member 104 which extends within the trough area 70 and is rotatably supported at opposite ends by side supports 26 and 28 of frame 24. Member 104 extends generally parallel to the rotatable axis of the cleaning assembly 62. A series of laterally elongated blades 106 radially extend from member 104 and serve to propel materials received from the primary cleaner assembly 62 toward the secondary cleaner assembly 64 for subsequent cleaning.

In addition to imparting rotary motion to cleaner assembly 62, drive mechanism 88 rotatably drives the secondary cleaner assembly 64, doffer assembly 66, and kicker means 76. Preferably, the drive mechanism 88 rotatably drives the component assemblies of the cleaning means 60 in timed relation relative to each other. Moreover, the drive mechanism 88 can be operated to conjointly drive both cleaner assemblies 62 and 64 in a direction opposite to that indicated by the arrows in FIG. 6 such that cotton materials delivered from the harvesting units can bypass the cleaning means 60 and be directed to the auger 44.

Each harvesting unit 20 is preferably connected to the frame 24 for rocking movement about a fixed axis. As shown in FIGS. 2 and 6, frame 24 further includes a laterally elongated support 108 provided toward a forward upper end of and connected between side supports 26 and 28. Support 108 extends generally parallel to the cleaner assembly 62 and preferably has a cylindrical configuration having sufficient rigidity and strength to inhibit bending of the support 108 between opposite ends thereof when the harvesting units 20 are connected thereto. A rear upper end of each harvesting unit 20 is connected to the support 108 in a conventional fashion as with brackets 110 and in a manner allowing the lateral spacing between adjacent harvesting units to be readily adjusted to accommodate the spacing between adjacent rows of cotton plants.

Cotton grows substantially along the entire height of the plant. At the lower end, cotton grows barely off the ground and sometimes on the ground. The harvesting units, therefore, are positioned to follow as close to the ground as possible to strip all of the cotton from the plants. To optimize efficiency during the harvesting operation, the height of each harvesting unit is controlled relative to the ground as the harvester is driven across the field.

As shown in FIG. 6, the elevation of each harvesting unit 20 on the head assembly 16 is primarily controlled by a driver 112 connected between frame 24 and a respective harvesting unit. In the preferred form, driver 112 includes a linearly distendable hydraulic cylinder or motor 114 for rocking a respective harvesting unit vertically relative to the frame. The cylinder 114 is connected to a source of hydraulic pressure on the harvester chassis and is controlled through a conventional height sensing system. As the cylinder is extended and retracted in response to variations in ground contour, the respective row unit is rocked up and down about the axis of the support 108 to maintain the harvesting unit a proper distance above the ground.

Those farmers who raise cotton continuously try different spacings between crop rows. As mentioned above, the harvesting head assembly 16 can include four or more harvesting units 20. Understandably, when the head assembly is configured with two or more harvesting units arranged on opposite sides of the longitudinal centerline of the harvester, the harvesting head assembly 16 must be wider than that required to accommodate two or more harvesting units arranged to one side of the longitudinal centerline in a narrowly spaced pattern.

Figure 9:
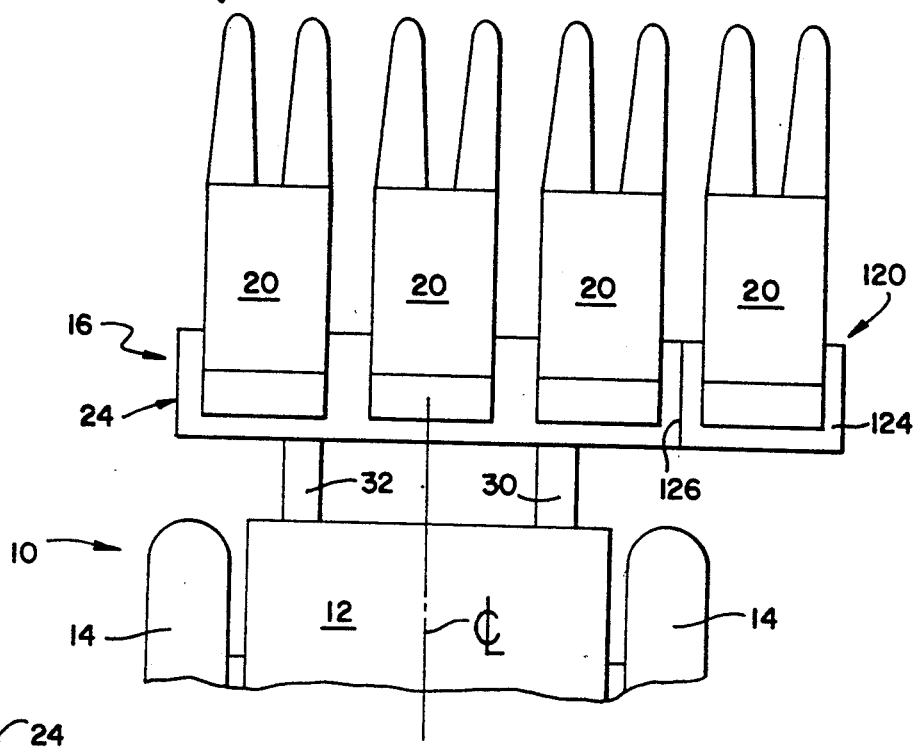
FIG. 9 is a schematic representation of a cotton harvester with a header assembly including an extension attached to one end of the header assembly and with a harvesting unit carried thereby.

To accommodate extra harvesting units for increased harvesting capacity or to allow the harvesting units to be arranged in a skip row pattern, and as shown in FIG. 9, the present invention further contemplates the addition of an extension 120 to the header assembly 16 such that one or more harvesting units can be arranged on each side of the longitudinal centerline of the harvester.

Figure 10:
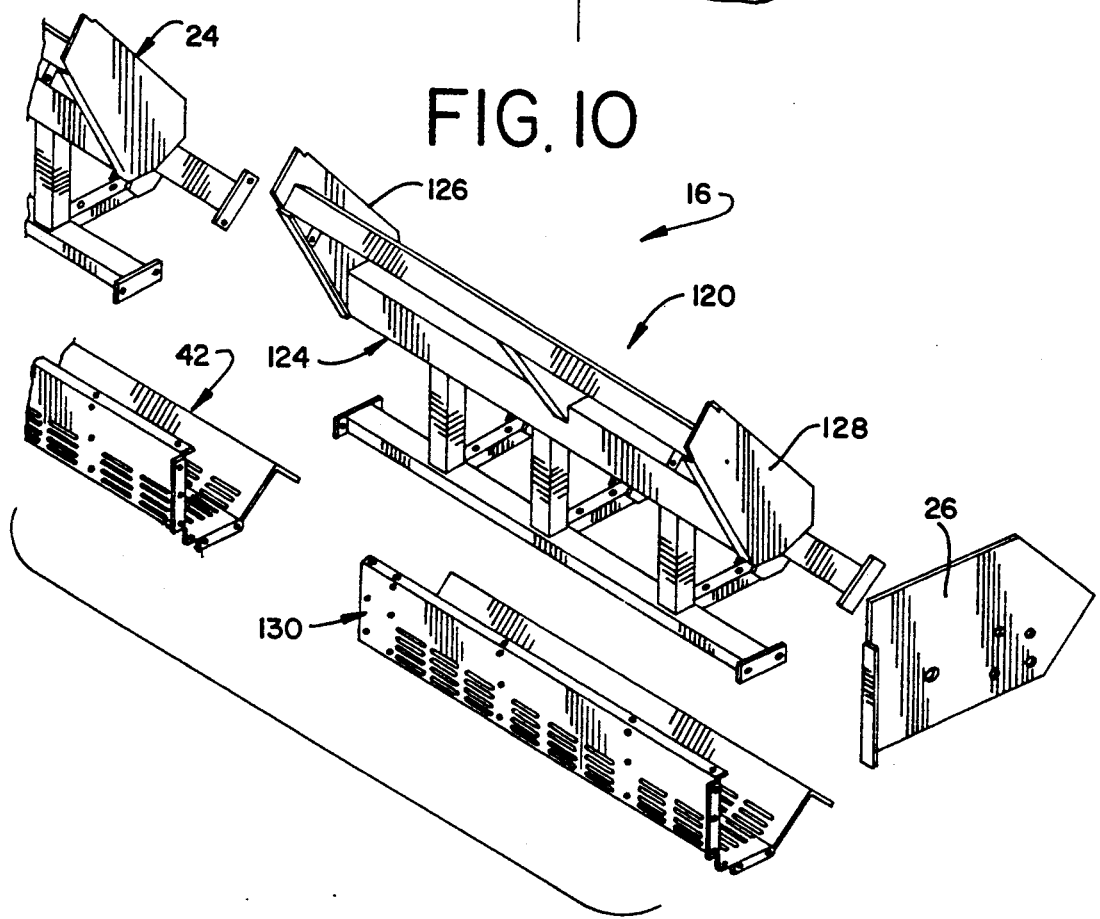
FIG. 10 is an exploded perspective view of some of the component parts of the header assembly illustrated in FIG. 9.

As shown in FIG. 10, extension 120 includes a frame extension 124 which is selectively attachable to frame 24. The frame extension 124 is substantially similar in structure to frame 24 and is adapted to accommodate one or more harvesting units thereon so as to allow the harvesting units of the harvester to be arranged in different patterns. To extend the width of the head assembly 16 beyond the width of frame 24, an inboard end 126 of frame extension 124 is abutted against and affixed to one end of frame 24. In the illustrated embodiment, side support 26 is removed from frame 24 and suitably affixed to an outboard end 128 of frame extension 124. Frame extension 124 further includes conventional panel structure 130 attached thereto to enclose the trough area 140 (FIG. 11) defined by the extension frame 120.

Figure 11:
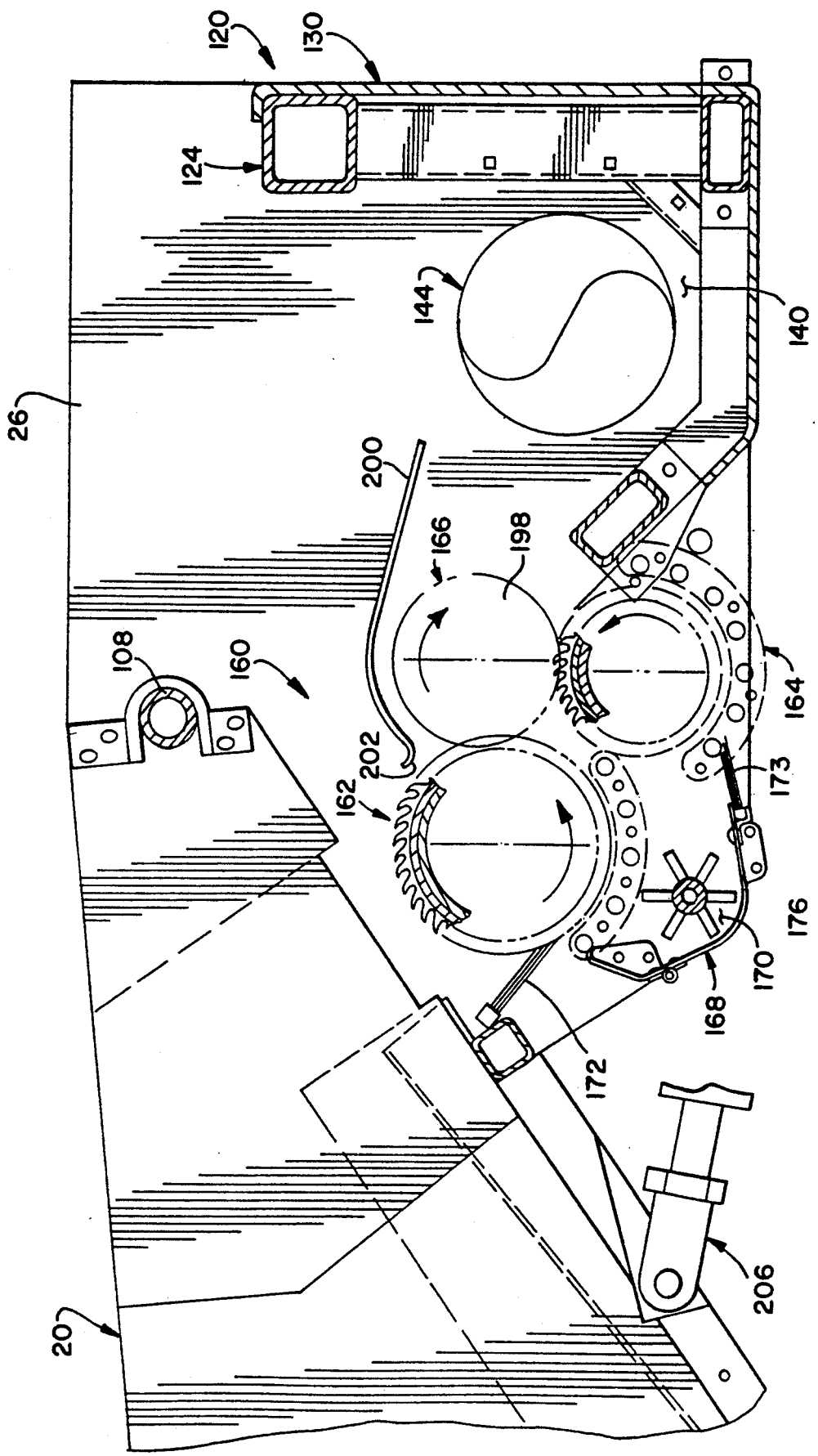
FIG. 11 is a side sectional view of auxiliary cleaning means associated with the extension attached to the harvesting head assembly as illustrated in FIG. 9.

As shown in FIG. 11, extension 120 further includes an auger extension 144 connected to an axial alignment with auger 44. (FIG. 6) on frame 24. The auger extension 144 extends within the trough area 140 rearwardly of the harvesting units supported on the extension 120. As will be appreciated, the auger extension 144 is appropriately configured to convey materials toward auger 44 and toward the duct structure 48.

To facilitate cleaning of the harvested materials received from the harvesting units mounted on the frame extension 124, extension 120 further includes auxiliary cleaning means 160 carried by the frame extension 124. Preferably, auxiliary cleaning means 160 includes a primary cleaner assembly 162, a secondary cleaner assembly 164, and a doffer assembly 166 for doffing or removing cotton materials from the auxiliary cleaner assemblies 162, 164 and advancing the cotton materials toward the auger extension 144.

Extension 120 further includes a housing 168 defining a trough area 170 beneath the auxiliary cleaner assembly 162 and forwardly of the auxiliary cleaner assembly 164. Housing 168 is substantially similar to housing 68 discussed in detail above and, thus, no further details will be necessarily provided therefor. Suitable brushes 172 and 173, similar to brushes 72 and 73 provided on housing 68, are provided on housing 168 to inhibit cotton materials from being discharged to the ground during operation of the auxiliary cleaning means 160 while allowing green bolls, stones, and rocks to pass therethrough.

In the preferred embodiment, the primary cleaner assembly 162 of auxiliary cleaning means 160 is axially aligned with and driven by primary cleaner assembly 62. Moreover, auxiliary cleaner assembly 162 is constructed substantially similar to the cleaner assembly 62 and, thus, no further details need to be provided therefor. Suffice it to say, cleaner assembly 162 is arranged behind and beneath the exhaust end of the harvesting units arranged on the extension 120 such that at least a portion of the auxiliary cleaner assembly 162 is arranged in material receiving relation to each harvesting unit connected to the extension 120.

Auxiliary cleaner assembly 164 is substantially similar in construction to cleaner assembly 64. Moreover, cleaner assembly 164 is axially aligned with and preferably driven by the secondary cleaner assembly 64.

Doffer assembly 166 includes suitable means for doffing or removing cotton materials from the auxiliary cleaner assemblies 162 and 164 and rearwardly advancing the cotton materials to the auger 144. In a preferred form of the invention, the doffer assembly 166 includes a laterally elongated and rotatably driven brush 198 which extends parallel to cleaner assemblies 162, 164 and is axially aligned with and driven by brush of doffer assembly 66. As with doffer assembly 66, the doffer assembly 166 further includes a shield 200 for directing cotton removed by the doffer assembly 166 from the cleaner assemblies 162, 164 toward the auger 144. As shown, a forward end 202 of the shield 200 is arranged in close proximity to the periphery of cleaner assembly 162 thereby inhibiting harvested materials discharged from the harvesting units 20 from advancing to the auger 144.

As with cleaning means 60, auxiliary cleaning means 160 further includes kicker means 176 arranged within the trough area 170 for propelling cotton materials gravitationally received from the auxiliary cleaner assembly 162 toward auxiliary cleaner assembly 164. In the illustrated embodiment, kicker means 176 is substantially similar in construction and is driven by kicker means 76.

The harvesting units on the extension 120 are mounted for elevational movement relative to the chassis. To effect such ends, each harvesting unit on the extension 120 includes a driver 206 for elevationally positioning the harvesting unit connected thereto relative to the frame 124.

During operation, the harvesting units 20 arranged on the harvester head assembly strip materials from the cotton plants as the harvester is driven through the field. As will be appreciated, the harvested materials contain a significant amount of trash and the like commingled with and which contaminates the cotton also contained within the harvested material. Depending on particular field conditions, about 30% to about 50% by volume of the harvested materials may be comprised of trash and the like.

A distinct advantage of the present invention concerns the provision of cleaning means interposed between the harvesting units exhaust and the auger adapted to convey materials to the duct structure 48 and, ultimately, to the receptacle. Arranging the cleaning means on the harvester in advance of the auger on the head assembly 16 allows trash and the like to be separated from cotton materials before the cotton is advanced to the duct 48 and the receptacle. Separating the trash and the like from the cotton before the cotton is moved to the auger offers several distinct advantages. First, eliminating 30% to 50% of the trash as the harvester operates means that about 30% to about 50% more cotton materials can be held by the receptacle 18. Such an increase translates to longer harvesting operations and, thus, a more efficient cotton harvester. Moreover, separating the trash from the cotton materials increases the efficiency of the air system 52 in moving cotton materials toward the receptacle. Notably, the cleaning means of the present invention discharges trash evenly across the width of the harvester.

Unlike other cleaning systems, the cleaning means of the present invention eliminates the need for an auxiliary air system for moving the materials from the auger of the head assembly to the cleaning system. The cleaning means of the present invention gravitationally receives harvested materials directly from the harvesting units which offer distinct advantages from air assisted cleaners. Moreover, the cleaning system of the present invention advantageously has a lower horsepower requirement due to the elimination of an auxiliary air system.

The cleaning system of the present invention offers advantageous operation in that at least a portion of the cleaning means extends rearwardly and beneath each harvesting unit arranged on the harvesting head assembly 16. Accordingly, the cleaning means on the harvesting head assembly has enhanced cleaning abilities in that a lengthwise portion of the cleaning means processes harvested materials from the harvesting unit arranged forwardly thereof rather than as an accumulative sum. Extending the cleaning means 60 rearwardly across the harvesting units 20 also facilitates lateral adjustment of the harvesting units 20 in that, regardless of the disposition of the harvesting units 20 on the header assembly, at least some lengthwise portion of the cleaning means is arranged in material receiving relation with each harvesting unit.

When the head assembly 16 is utilized with an extension 120, auxiliary cleaning means 160 including auxiliary cleaning assemblies 162 and 164 and an auxiliary doffer assembly 166 can be readily arranged in axial alignment with the cleaner assemblies 62 and 64 and doffer assembly 66 of cleaning means 60 to facilitate processing harvested materials received from the harvesting units arranged on the extension 120. As will be understood, the provision of the auxiliary means 160 allows the increased harvesting capacity of the harvester to be readily handled and will not affect the harvesting operation. Moreover, extension 120 allows the harvesting units to be arranged on the head assembly 16 in any of a plurality of patterns with the auxiliary means 160 offering the same benefits to those harvesting units arranged on the extension 120 as is offered by the cleaning means 60 on frame 24.

From the foregoing, it will be observed that numerous modifications and variations can be effected without departing from the true spirit and scope of the novel concept of the present invention. It will be appreciated that the present disclosure is intended as an exemplification of the invention, and is not intended to limit the invention to the specific embodiment illustrated. The disclosure is intended to cover by the appended claims all such modifications as fall within the scope of the claims.

What is claimed is:

1. A cotton harvester having a fore-and-aft extending chassis adapted for movement across a cotton field, a harvesting head assembly laterally extending across and supported on the chassis, a duct carried on the chassis for directing materials toward a receptacle, said duct including an inlet arranged in receiving relation relative to said head assembly, an air system for creating an air flow within said duct to facilitate movement of materials toward said receptacle, and wherein said harvesting head assembly includes a plurality of harvesting units for harvesting materials including a commingled mixture of trash and cotton materials as the harvester is driven across the field, a rotatably driven auger extending rearwardly and across the harvesting units, and cleaning means for receiving harvested materials from the harvesting units for cleaning whereby at least a portion of the trash and the like is separated from cotton materials before the cotton materials are moved to the auger thereby enhancing efficiency of said air system in moving materials toward said receptacle.

2. The cotton harvester according to claim 1 wherein said cleaning means includes a laterally elongated cleaning assembly disposed such that a section of said cleaning assembly extends rearwardly of each harvesting unit to clean cotton materials received therefrom.

3. The cotton harvester according to claim 2 wherein said cleaning means further includes means for doffing cotton materials from said cleaning assembly and directing doffed cotton materials to said auger.

4. The cotton harvester according to claim 2 in which the cleaning means includes drive means for normally driving said cleaning assembly in a first rotational direction while allowing for reversal of the cleaning assembly in a second rotational direction.

5. The cotton harvester according to claim 1 further including housing means for enclosing said cleaning means, said housing means including a releasably closed door disposed adjacent said cleaning means for allowing service access to said cleaning means.

6. The cotton harvester according to claim 1 wherein each harvesting unit includes a fore-and-aft extending harvesting compartment, and wherein said cleaning means includes a laterally elongated cleaning assembly having a fixed axis of rotation disposed vertically below an exhaust end of each harvesting unit to facilitate gravitational movement of harvested crop materials toward the cleaning assembly.

7. A cotton harvester having a mobile chassis and a harvesting head assembly laterally extending across and supported on said chassis, said harvesting head assembly comprising a rotatably driven auger means laterally extending across said chassis, harvesting means for removing a commingled mixture of trash and cotton materials from the plants, and means interposed between said harvesting means and said auger means for separating at least a portion of the trash and the like from cotton materials before the auger means receives the cotton materials.

8. The cotton harvester according to claim 7 wherein said harvesting means includes a plurality of harvesting units supported on a frame in side-by-side relation relative to each other, and wherein the lateral spacing of said harvesting units accommodates spacing between rows of cotton plants adapted to be harvested by the cotton harvester.

9. The cotton harvester according to claim 8 wherein said separating means comprises a primary cleaning assembly extending laterally across said harvester, such that at least a portion of said primary cleaning assembly extends in material receiving relation with each harvesting unit, a secondary cleaning assembly extending laterally across said harvester adjacent said primary cleaning assembly, and means for doffing cotton from said primary and secondary cleaning assemblies.

10. The cotton harvester according to claim 9 wherein said separating means further includes a housing defining a trough area beneath said primary cleaning assembly and into which cotton materials gravitate, and means for propelling cotton materials from said trough area toward said secondary cleaning assembly for additional processing.

11. The cotton harvester according to claim 7 wherein said separating means includes a laterally elongated cleaning assembly, a section of which extends across such of said harvesting units to extract trash from the harvested cotton materials.

12. The cotton harvester according to claim 11 wherein said separating means includes doffer means for advancing cotton materials between said cotton cleaning assembly and said auger means.

13. The cotton harvester according to claim 7 wherein said separating means includes a laterally elongated cleaning assembly, said cleaning assembly extending across and in receiving relation to the harvesting units to extract trash from the harvested materials and distribute the trash across the width of the harvester.

14. A cotton harvester for harvesting cotton materials from a plurality of rows of cotton plants planted in generally parallel rows in a field, the harvester comprising a fore-and-aft extending chassis adapted for movement over the field, a harvesting head assembly extending laterally across a forward end of said chassis, cotton conveying duct means arranged in cotton receiving relation to and extending upwardly from the harvesting head assembly and toward a receptacle, and wherein said harvesting head assembly comprises a support structure connected to said chassis for generally vertical movement relative to said chassis, a plurality of fore-and-aft extending harvesting units individually connected to said support structure and arranged in side-by-side relation for harvesting materials in a commingled mixture of cotton materials and trash from the plants as the harvester is driven across the field, with at least two of said plurality of harvesting units being arranged on opposite lateral sides of a longitudinal center of said chassis, rotatably driven auger means arranged on said support structure to extend rearwardly across and below an exhaust end of said harvesting units for gathering and conveying materials toward a discharge area, means for processing the commingled mixture of materials received from all the harvesting units, said processing means including rotatable means for separating cotton from the commingled mixture of materials received from the harvesting units, and means for doffing cotton from the separating means and delivering the cotton to said auger means for deliverance to said receptacle.

15. The cotton harvester according to claim 14 wherein said auger means includes left and right spiral sections for conveying cotton discharged from said processing means toward opposite lateral sides of the center of the harvester toward the longitudinal center of the harvester.

16. The cotton harvester according to claim 14 wherein said head assembly further includes means for supporting each harvesting unit for generally vertical movement, and driver means individually connected to each harvesting unit for rocking a respective harvesting unit about said supporting means.

17. The cotton harvester according to claim 16 wherein said driver means includes a plurality of linearly distendable hydraulic motor means connected between the harvesting units and the support structure for rocking the harvesting units vertically relative to the support structure.

18. The cotton harvester according to claim 14 wherein said separating means includes a primary cleaner assembly and a secondary cleaner assembly arranged to receive cotton materials from the harvesting units.

19. The cotton harvester according to claim 18 wherein each cleaner assembly has a saw-tooth peripheral configuration for separating cotton from the materials harvested by the harvesting units.

20. The cotton harvester according to claim 14 wherein said harvesting head assembly further includes a second support structure selectively attachable to the support structure connected to said chassis, said second support structure being adapted to mount one or more harvesting units thereon so as to allow the harvesting units to be arranged in different patterns, an auger extension connected to and in axial alignment with said auger means, and auxiliary cleaning means carried by said second support structure and arranged in axial alignment with the rotatable separating means for separating cotton from the harvested materials received from the one or more harvesting units connected to said second support structure.

21. The cotton harvester according to claim 14 wherein at least a portion of said processing means is arranged in cotton receiving relation to each of said harvesting units on the harvester.

22. A cotton harvester including a mobile chassis and a harvesting head assembly supported across the chassis and adapted to be moved vertically relative to said chassis by a pair of hydraulically powered arms pivotally connected to and extending forwardly from said chassis, rotatably driven auger means carried by said head assembly, harvesting means carried on said head assembly for vertical movement therewith, said harvesting means removing a commingled mixture of materials including trash and cotton from plants as the harvester moves across a field, and cleaning means carried by and movable with the head assembly for gravitationally receiving and processing the commingled mixture of materials from the harvesting means thereby separating trash from cotton as the harvester moves across a field.

* * * * *